Nov. 19, 1963    W. A. SPOFFORD    3,111,010
AIR CONDITIONING CONTROL APPARATUS
Filed Sept. 6, 1962
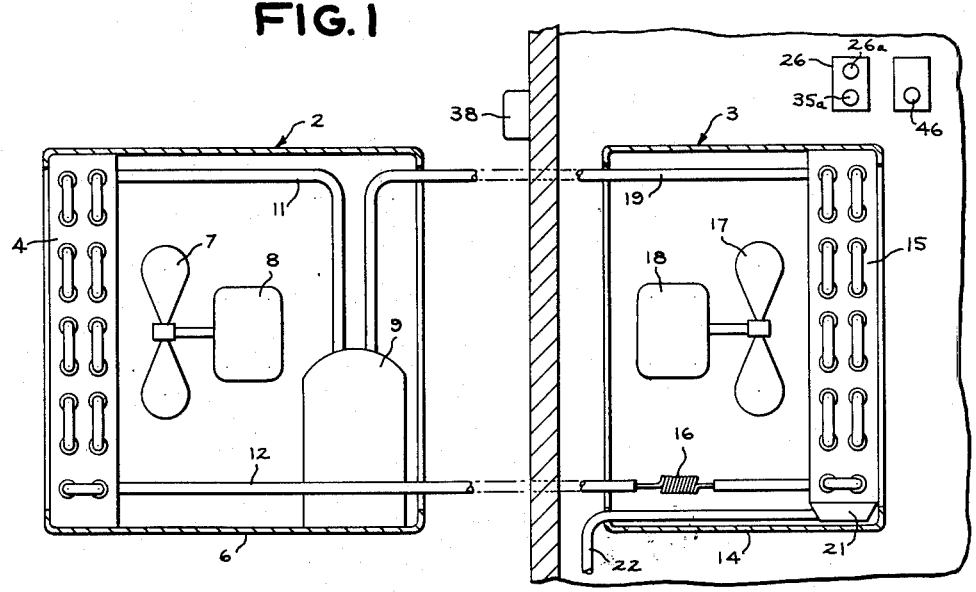
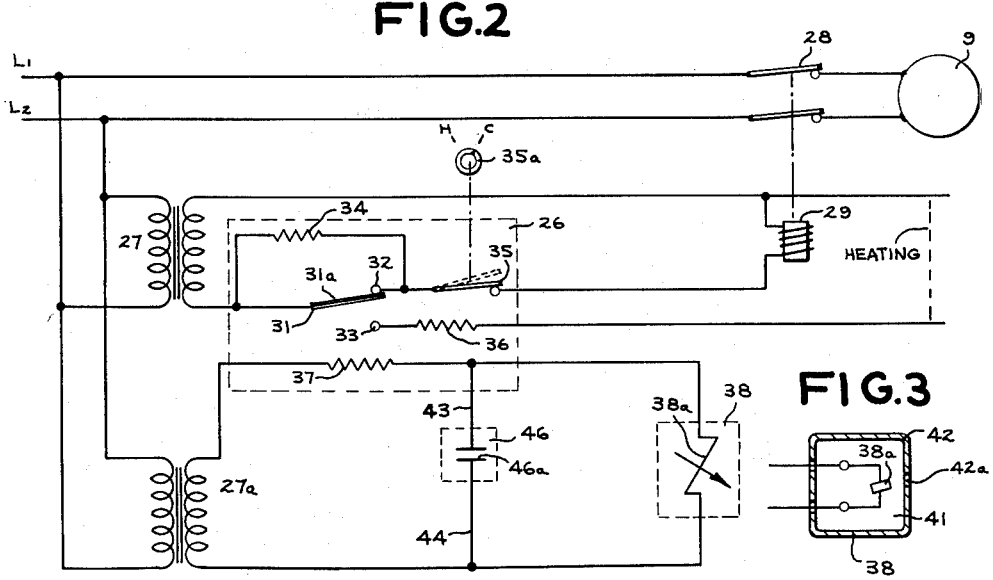
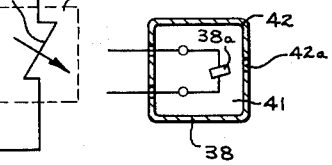
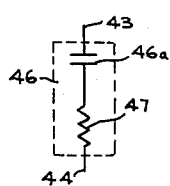
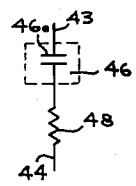
INVENTOR.
WARREN A. SPOFFORD
BY
HIS ATTORNEY

United States Patent Office 3,111,010
Patented Nov. 19, 1963

3,111,010
AIR CONDITIONING CONTROL APPARATUS
Warren A. Spofford, Tyler, Tex., assignor to General
Electric Company, a corporation of New York
Filed Sept. 6, 1962, Ser. No. 221,711
5 Claims. (Cl. 62—176)

The present invention relates to air conditioning control apparatus and more particularly to control apparatus designed to provide improved control of humidity conditions within an enclosure.

Room thermostats for controlling the operation of air conditioning and heating equipment have previously used small resistance heaters located within the thermostat for biasing the temperature sensing member of the thermostat in order to provide more improved control of the heating or cooling requirements of an enclosure. The biasing heaters can be utilized in many different ways to provide heat within the thermostat that causes the temperature sensing member to sense a temperature somewhat higher than that of the enclosure. One such control arrangement provides a biasing heater that is adapted to increase its heat as the outdoor temperature rises and to decrease its heat as the outdoor temperature falls thereby anticipating the greater or lesser heat requirements of the enclosure, whichever the case may be.

There are times, however, when a biasing heater responsive to outdoor temperatures may not provide quite the desired type of operation of the air conditioning equipment to control the comfort conditions within an enclosure. For example, even though the outdoor temperature drops suddenly, the humidity conditions within an enclosure or building may be extremely high and it may be desirable to operate the air conditioning equipment for a greater period of time to reduce the moisture content of the air within an enclosure. However, when the outdoor temperature drops, the heat output of the biasing heater is greatly reduced, thus causing the thermostat to turn off the air conditioning equipment more quickly than if the outdoor temperature remained relatively high. The present invention is an improvement over the above-mentioned type of control arrangement and is adapted to provide better control over the humidity conditions within an enclosure or building.

It is, therefore, an object of the present invention to provide a thermostat incorporating a biasing heater responsive to outdoor temperature conditions and including means for overriding the outdoor control when high humidity conditions prevail within the enclosure.

A more specific object of the present invention is to provide a control arrangement for an air conditioning apparatus, including a room thermostat incorporating a biasing heater within a circuit controlled by a thermistor adapted to decrease the biasing heater output when the outdoor temperature drops and incorporating a bypass circuit around the outdoor control for increasing the heat output of the biasing heater in accordance with humidity conditions within the enclosure.

Further objects and advantages of the present invention will become apparent as the following description proceeds and the features of novelty which characterize the invention will be pointed out with particularity in the claims annexed to and forming a part of this specification.

In carrying out the objects of the present invention, there is provided a thermostat control for an air conditioning apparatus adapted to provide cooling of an enclosure. The thermostat is provided with a biasing heater adapted to supply varying quantities of heat to the air surrounding the temperature sensing member of the thermostat thereby causing the member to sense a temperature somewhat higher than that actually existing in the enclosure, depending upon the amount of heat supplied by the heater. The output of the heater is controlled by a circuit including a thermistor responsive to outdoor temperature conditions and by a parallel circuit responsive to humidity conditions within the enclosure.

For a better understanding of the invention reference may be had to the accompanying drawings in which:

FIGURE 1 is a diagrammatic illustration of a reversible cycle refrigeration apparatus adapted to provide heating and cooling for an enclosure;

FIGURE 2 is a schematic diagram of a control circuit embodying the control arrangement of the present invention;

FIGURE 3 is a front view of the thermistor member with the cover of the mounting box removed;

FIGURE 4 is a view of the humidistat control portion of the circuit of FIGURE 2 illustrating another embodiment of the invention; and FIGURE 5 is a view of the humidistat control portion of the circuit of FIGURE 2 illustrating the third arrangement of the invention.

Referring now to FIGURE 1, there is shown an air conditioning apparatus including an outdoor or condensing section 2 and an indoor or cooling section 3. The outdoor section of such a unit usually incorporates an outdoor heat exchanger 4 mounted within a suitable case 6. Also mounted within the case 6 is a means for moving air over the heat exchanger 4, such as the fan 7 driven by the fan motor 8. A compressor 9 is usually provided in the outdoor section for compressing refrigerant and pumping it through the various conduits of the system to provide cooling and dehumidification of air within the enclosure. As may be seen in FIGURE 1 a discharge tube 11 leads from the compressor to the outdoor heat exchanger or condenser 4 where the hot gas flowing from the compressor is condensed and carried through a tube 12 leading into the enclosure.

Tube 12 connects with the indoor section or cooling section 3 which is normally enclosed within a case or duct work 14 located at some point within the house or building. The indoor section 3 usually includes a heat exchanger 15 which, in a straight cooling apparatus, is an evaporator. Expansion means, such as the capillary 16 in the conduit 12 expands the refrigerant flowing from the outdoor section 2 to evaporator pressure so that the liquid refrigerant evaporates within the heat exchanger 15 and cools the air flowing thereover. Means, such as the fan 17 driven by the motor 18, circulates air from the house or enclosure through the cooling unit housing 14. Discharge gas is ducted out of the evaporator 15 through the line 19 back to the compressor 9 where the gas is again compressed and recirculated through the system.

Air conditioning apparatus of this general type is well known in the art and serves to cool the air and dehumidify the air stream blown over the evaporator 15 from within the enclosure. As the air from the enclosure flows over the evaporator 15 it is both cooled and dehumidified. That is, the air temperature is reduced below the dew point of the moisture therein and it condenses out of the air stream as it passes through the evaporator 15. The water or moisture removed from the air stream collects on the evaporator coils and drains downwardly from the evaporator into a container or drip tray 21, where it is collected and removed by suitable drain means, such as the line 22 connecting with the drip tray 21.

As thus far described, this particular air conditioning apparatus is not considered essential to the invention, insofar as the structure is concerned, but is intended only to be illustrative of the general type of air cooling or dehumidifying apparatus to which the control arrangement of the present invention may be adapted. It should be understood that the air conditioning apparatus need not be of the split unit type with one section outside the enclosure and one section inside the enclosure but may be of the integral unit type wherein the two sections of the apparatus are located in one case and duct work is provided for circulating outdoor air through the condensing section of the apparatus. It should also be understood that the invention can be applied to air conditioning apparatus, commonly called heat pump apparatus, which utilizes a reversible refrigeration system that may be operated in the winter season to provide heat and operated in the cooling season to provide cooling. As will now be explained, the present invention deals with a thermostat control arrangement designed to control the operation of the above-described air conditioning apparatus and heat apparatus to provide improved control of the comfort conditions within a house or enclosure.

Referring now to FIGURE 2, there is shown a control arrangement for operating the above-described air conditioning system to provide cooling and dehumidification of the air within the enclosure as well as to initiate a heating operation whenever temperature conditions within the enclosure so require it. Refrigeration control circuits of this type for air conditioning systems are usually much more complicated than that illustrated in FIGURE 2, but only those components necessary for a full understanding of the present invention are included in the circuit diagram. Those controls, such as high-pressure cut-out switches and compressor overload controls, are not included in the diagram inasmuch as they are not necessary for a full understanding of the invention.

The control circuit incorporates a room thermostat, which is denoted by the dotted line bounded area 26 in FIGURE 2, and includes those components located therein. Reference numeral 26 represents the thermostat housing which, as may be seen in FIGURE 1, is usually placed on an inner wall of an enclosure where it is exposed to air from the enclosure and may be easily reached by the occupants thereof. A suitable transformer 27 is provided for transforming line power, supplied through the household or building circuitry through lines L1 and L2, to a low voltage power suitable for the components of the control circuit. Obviously, line voltage type controls could be utilized for this purpose but, in order to minimize the cost of the components of the control circuitry, it is more desirable to use a transformer and a low voltage thermostat and other controls such as is illustrated in FIGURE 2. Control power is taken from the transformer 27 and supplied to the various components of the control circuit including the thermostat and other control components located within the thermostat box 26.

The thermostat is usually manually adjustable by the occupants of the enclosure for selecting predetermined temperatures at which the heating equipment or cooling apparatus will be energized. Various arrangements have been utilized in the past for adjusting the thermostat operating temperature through a control, such as knob 26a, on the front of the thermostat (FIGURE 1) which changes the relative positions of the thermostat switches or temperature responsive members located therein. Adjustable thermostats are well-known in the art and, inasmuch as the particular means for adjustment plays no part in the operation of the present invention, a further description thereof is not believed necessary for a full and complete understanding of the invention.

In the circuit shown in FIGURE 2, it will be observed that line power is supplied to the compressor 9 through lines L1 and L2 and is controlled by a gang switch 28, operated by a relay or solenoid 29 which causes the gang switch 28 to open when the solenoid 29 is de-energized and to close when the solenoid or relay 29 is energized. In order to energize the solenoid 29 according to temperature rises within the enclosure, the thermostat 26 is provided with a temperature sensing member 31, of any well-known type such as a bimetal member or expansion bellows, which is adapted to operate a switch to electrically energize the solenoid control circuit whenever the temperature of the enclosure rises above a predetermined temperature as adjusted on the thermostat by the occupants of the enclosure. As shown schematically in FIGURE 2, the temperature sensing member 31 is adapted to move a blade 31a to make contact with one or the other of a pair of contacts 32 and 33. Thus, when the temperature rises within the enclosure, member 31 causes blade 31a to move into engagement with contact 32 thus energizing the circuit including the solenoid 29 thereby energizing the compressor of the refrigeration system. As the temperature decreases within the enclosure, such as likely to occur during the heating season, the blade 31a is moved by the temperature sensing member 31 in the direction toward the contact 33 for energizing a circuit including the heating components of the building, such as a warm air furnace.

In the illustrated embodiment, the thermostat 26 is provided with biasing heaters which provide anticipating heat to the device during cooling and heating operation. More specifically the thermostat 26 is provided with a cooling anticipator heater 34 in the form of a small resistance heater, which is connected into the circuitry at all times during the cooling season and adds heat to the thermostat during periods when the temperautre of the enclosure is rising toward that temperature selected for operation of the cooling system. The heater 34 adds heat to the region around the temperature sensing member 31 to make the sensing member 31 sense an air temperature slightly above that of the enclosure thereby making the blade 31a close sooner than would normally be expected when the enclosure temperature is rising. Once the blade 31a closes or engages the contact 32 of the cooling or solenoid circuit, most of the current flow through the thermostat passes through the circuit including the thermostat switch member 31 and shunts the resistance heater 34 thereby reducing the heat output of the heater 34 when the air conditioning apparatus is operating. This causes the thermostat to energize the compressor more quickly as the temperature rises within the enclosure but permits continued operation of the compressor for a shorter length of time as the enclosure begins to cool. The thermostat may be provided with a switch member 35 which may be manually or otherwise controlled to remove the cooling elements from the circuitry, which is desirable during the heating season. When the switch 35 is opened, as shown in dotted lines in FIGURE 2, this breaks the circuit including the cooling anticipating heater 34 and the cooling contact 32. It should be noted, that heat added to the thermostat causes the thermostat member to move the blade 31a in the direction toward the contact 32 or in the direction to energize the cooling circuit. When heat is removed from the area adjacent the temperature sensing member 31 the blade tends to move in the other direction or in the direction toward the contact 33.

When the temperature falls below a predetermined temperature, which may be selected by the occupant of the enclosure, the bimetal blade 31a engages the contact 33 and energizes control switches (not shown) for operating the heating apparatus of the building or enclosure. A series connected heating anticipator 36 supplies heat to the thermostat tending to cause the thermostat to interrupt the heating cycle, or heating circuitry, when the temperature of the enclosure approaches that predetermined temperature desired or set on the thermostat by the occupants. The heat supplied by the heating anticipator tends to cause the thermostat to sense a temperature somewhat greater than that of the enclosure, during operation of the heating components of the building, thereby causing the thermostat to de-energize these components sooner as the enclosure temperature rises. However, since the anticipating heater 36 is removed from the circuit as the thermostat or blade 31a disengages the contact 33, it will permit the energization of the heating circuit very quickly as the enclosure temperature falls. Providing heat anticipation or false heat through anticipating heaters such as 34 and 36 for temperature controlled thermostat devices, eliminates the over-shoot normally occurring in temperature controlled heating and cooling systems and promotes the continuous cycling on and off of the heating or cooling systems at a rate so as to maintain a relatively satisfactory temperature.

In order to give a more precise control of the comfort conditions within an enclosure, the control arrangement is provided with a third anticipating or biasing heater 37 in the thermostat 26. The heater 37 is supplied with power through a low voltage control circuitry including the transformer 27a and is connected in series with a thermistor 38 located outside the enclosure where it is exposed to outdoor air temperature. The thermistor 38 is characterized by resistance 38a which may be seen in FIGURE 3. Resistance 38a has a coefficient of resistance that inversely varies with the temperature applied thereto, and is preferably mounted on a terminal board 41 within a case 42 having openings 42a therein to permit free flow of outdoor air therethrough. As may be seen in FIGURE 1, the thermistor 38 is mounted outdoors in some position where it will give an accurate indication of the outdoor air temperature. A preferable location for the thermistor 38 is on the north side of a dwelling under the overhanging eaves of the building.

The characteristics of the thermistor are such that as the outdoor temperature decreases, the resistance of the thermistor material 38a increases, causing a reduction in current through the circuit into which it is connected. This results in a reduction in the heat output of the biasing heater 37 connected in series with the thermistor and the transformer 27a. Thus, as the outside temperature goes down, the heat given off by the biasing heater 37 decreases. The thermostat senses that the room is cooler than it was before and causes the cooling unit to turn off quicker than it normally would. As the outdoor temperature rises, the resistance of the thermistor 38 decreases and the heat given off by the biasing heater 37 correspondingly increases causing the temperature sensing member 31 of the thermostat to sense a temperature somewhat higher than it normally would thereby causing the blade 31a to energize the cooling circuitry more quickly than would normally be required by the temperature of the air surrounding the sensing member.

The operation of the above-described control arrangement using the thermistor 38 tends to de-energize the cooling apparatus more quickly than normal in order to provide slightly increasing enclosure temperatures as the outdoor temperature falls. This acts to maintain a condition of comfort within the enclosure even though the internal surfaces of the walls of the house or enclosure reduce in temperature as the outdoor temperature decreases. And conversely, as the outdoor temperature rises, the control arrangement tends to energize the cooling apparatus more quickly than normal to provide decreasing enclosure temperature. The characteristics of the thermistor thus cause the system to anticipate the reducing outdoor temperature or the increasing outdoor air temperature as the case may be.

There are times, however, when the conditions within the enclosure are such that when the outdoor temperature falls it is undesirable to reduce the amount of cooling within the enclosure. For example, when the relative humidity within the enclosure is high, it may be desirable to operate the cooling and dehumidifying apparatus for longer periods and it may be undesirable under these conditions to reduce the heat output of the biasing heater 37 even though the outdoor temperature might be relatively low. In order to overcome such a condition, there is provided in the present invention a humidistat controlled means or device 46 arranged in a shunt circuit around the thermistor 38 so that the current flow through the biasing heater 37 may be shunted around the thermistor 38 to provide full biasing of the thermostat whenever the humidity conditions within the enclosure are relatively high. The shunt circuit comprises lines 43 and 44, in parallel with the circuitry leading to the outdoor thermistor 38, and, in a preferred embodiment, includes a switch, such as the switch 46a illustrated in FIGURE 2. Switch 46a is controlled by a humidistat 46 arranged within the enclosure and responsive to humidity conditions therein. As may be seen in FIGURE 1, a humisistat 46 is mounted on an inner wall of the enclosure adjacent the thermostat 26. Obviously the thermostat and humidistat 46 may be mounted within a single casing but the preferable arrangement is to mount them separately so that the heat output of one does not influence the other. Humidistat switches or humidity responsive devices for operating switch members are well-known in the art and a detailed description, thereof, is not believed essential for a full understanding of the invention. These devices usually operate a switch, such as switch 46a, upon a rise in hmuidity conditions within the enclosure.

During operation, the switch 46a closes whenever there are high humidity conditions within the enclosure thereby shunting the current of the circuit around the thermistor 38, or the resistance 38a of the thermistor, to provide a greater current flow through the biasing heater 37. This, of course, tends to cause the temperature sensing member 31 to sense a temperature higher than normally would be the case and causes the thermostat to maintain the air conditioning apparatus in operation for greater periods of time to provide greater dehumidification or moisture removal from the air within the enclosure. The addition of the humidistat control device 46 in parallel with the thermistor 38 improves the comfort conditions during the cooling season by causing the thermostat to operate the cooling equipment to further dehumidify the indoor air under circumstances where the outdoor temperature may have dropped and the heat of the biasing heater 37 would otherwise be greatly reduced.

Another embodiment of the present invention is illustrated in FIGURE 4 which shows only the humidistat controlled shunt circuit designed to connect into the main control circuit with lines 43 and 44 connected as in FIGURE 2. In this arrangement a humidistat controlled switch 46a is provided in the shunt circuit and a resistance 47 is arranged in series with the humidistat switch and disposed adjacent thereto. The heat liberated by the resistor 47 warms the air surrounding the humidity sensing element of the humidistat 46 thereby reducing the percent relative humidity at the sensing element faster than would otherwise occur due to the cooling and dehumidifying action of the air conditioning equipment alone. This feature provides a humidity anticipation which is somewhat analagous to the cooling anticipation and heating anticipation used in the thermostat. The effect of this is to provide control of the enclosure comfort conditions within a narrower range of percent relative humidity than is possible by the movement of the electrical contacts of a humidity sensing element from the on to off position.

Another feature of the circuit of FIGURE 4 is that the resistor 47 is electrically in parallel with the outdoor thermistor, or resistance 38a of the outdoor thermistor, so that there is less biasing of the thermostat biasing heater 37 than occurs when the humidistat switch means 46 merely short circuits the outdoor thermistor. Thus, the use of this resistor 47 offers more design freedom in adjusting the electrical circuit characteristics to best advantage for both summer and winter control.

Referring now to FIGURE 5, there is shown still another arrangement of the humidistat controlled shunt circuit to be utilized in conjunction with the control arrangement of FIGURE 2. In this arrangement a resistor 48 is positioned in series with the humidistat switch 46a but is installed remote from the humidity sensing element of the humidistat 46 so that its heat dissipation does not bias the humidistat performance. This arrangement places the resistance 48 in parallel with the resistance 38a of the thermistor and thus permits greater design freedom for designing the electrical circuit characteristics to best advantage for both summer and winter control without providing the biasing of the humidistat during high humidity conditions.

While there has been described what at present is considered to be the preferred embodiment of the invention, it will be apparent that some changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

1. A control arrangement for an air conditioning apparatus of the type having a heat exchange unit adapted to cool and dehumidify air from an enclosure comprising a thermostat mounted for exposure to air of said enclosure, a temperature responsive member in said thermostat movable in one direction as the temperature of the air adjacent said member increases and movable in a reverse direction as the temperature of air adjacent said member decreases, switch means operated by said temperature responsive member to energize said air conditioning apparatus as the air temperature adjacent said member rises above a predetermined high temperature and for de-energizing said air conditioning apparatus as the temperature adjacent said member falls below a predetermined low temperature, a biasing heater in said thermostat for adding small quantities of heat to the air surrounding said temperature responsive member thereby biasing said member in a direction tending to close said switch means to energize said air conditioning apparatus, a thermistor having a coefficient of resistance inversely related to the temperature of said thermistor and disposed outside said enclosure so that the resistance of said thermistor is responsive to the temperature of the outdoor air, said thermistor being electrically connected in series with said biasing heater thereby to decrease the current flow through said heater and the quantity of heat output thereof as the outdoor air temperature falls and adapted to increase the current flow through said heater and the heat output thereof as the outdoor air temperature rises, a bypass circuit around said thermistor for shunting electrical current around said thermistor to said biasing heater, humistat control means in said bypass circuit for increasing the current flow through said bypass circuit in response to high humidity conditions within said enclosure and for decreasing current flow through said shunt circuit in response to low humidity conditions within said enclosure thereby to assure increased heat output from said biasing heater in said thermostat when high humidity conditions exist in said enclosure even though the outdoor air temperature may be relatively low.

2. A control arrangement for an air conditioning apparatus of the type having a heat exchange unit adapted to cool and dehumidify air from an enclosure comprising a thermostat mounted for exposure to air of said enclosure, a temperature responsive member in said thermostat movable in one direction as the temperature of the air adjacent said member increases and movable in a reverse direction as the temperature of the air adjacent said member decreases, switch means operated by said temperature responsive member to energize said air conditioning apparatus as the air temperature adjacent said member rises above a predetermined high temperature and for de-energizing said air conditioning apparatus as the temperature adjacent said member falls below a predetermined low temperature, a biasing heater in said thermostat for adding small quantities of heat to said air surrounding said temperature responsive member thereby biasing said member in a direction tending to close said switch means to energize said air conditioning apparatus, a thermistor disposed outside said enclosure and responsive to the temperature of outdoor air, said thermistor being electrically connected in series with said biasing heater and adapted to decrease the current flow through said heater and the quantity of heat output thereof as the outdoor air temperature falls and adapted to increase the current flow through said heater and the heat output thereof as the outdoor air temperature rises, a humidistat mounted within said enclosure and adapted to sense the humidity of said air in said enclosure, a bypass circuit around said thermistor for shunting electrical current around said thermistor to said biasing heater, and current control means in said bypass circuit actuated by said humidistat in response to high humidity conditions within said enclosure for conditioning said bypass circuit to conduct current around said thermistor to said biasing heater thereby to increase the heat applied to said thermostat when high humidity conditions exist in said enclosure regardless of said outdoor air temperature.

3. A control arrangement for an air conditioning apparatus of the type having a heat exchange unit adapted to cool and dehumidify air from an enclosure comprising a thermostat mounted for exposure to air of said enclosure, a temperature responsive member in said thermostat movable in one direction as the temperature of the air adjacent said member increases and movable in a reverse direction as the temperature of the air adjacent said member decreases, switch means operated by said temperature responsive member to energize said air conditioning apparatus as the temperature adjacent said member rises above a predetermined high temperature and for de-energizing said air conditioning apparatus as the temperature adjacent said member falls below a predetermined low temperature, a biasing heater in said thermostat for adding small quantities of heat to said air surrounding said temperature responsive member thereby biasing said member in a direction tending to close said switch means to energize said air conditioning apparatus, a thermistor disposed outside said enclosure and responsive to the temperature of outdoor air, said thermistor being electrically connected in series with said biasing heater and adapted to decrease the current flow through said heater and the quantity of heat output thereof as outdoor air temperature falls and adapted to increase the current flow through said heater and the heat output thereof as the outdoor air temperature rises, a humidistat mounted within said enclosure and adapted to sense the humidity of the air in said enclosure, a bypass circuit around said thermistor for shunting electrical current around said thermistor to said biasing heater, switch means in said bypass circuit actuated by said humidistat in response to high humidity conditions within said enclosure for conditioning said bypass circuit to conduct current around said thermistor to said biasing heater in said thermostat thereby to provide maximum heat output to said thermostat when high humidity conditions exist in said enclosure regardless of said outdoor air temperature.

4. A control arrangement for an air conditioning apparatus of the type having a heat exchange unit adapted to cool and dehumidify air from an enclosure comprising a thermostat mounted for exposure to air of said enclosure, a temperature responsive member in said thermostat movable in one direction as the temperature of the air adjacent said member increases and movable in a reverse direction as the temperature of the air adjacent said member decreases, switch means operated by said temperature responsive member to energize said air conditioning apparatus as the temperature adjacent said member rises above a predetermined high temperature and for de-energizing said air conditioning apparatus as the temperature adjacent said member falls below a predetermined low temperature, a first biasing heater in said thermostat for adding small quantities of heat to the air surrounding said temperature responsive member thereby biasing said member in a direction tending to close said switch means to energize said air conditioning apparatus, a thermistor disposed outside said enclosure and responsive to the temperature of outdoor air, said thermistor having a coefficient of resistance inversely related to the temperature thereof and being electrically connected in series with said first biasing heater thereby to decrease the current flow through said heater and the quantity of heat output thereof as outdoor air temperature falls and adapted to increase the current flow through said first biasing heater and the heat output thereof as the outdoor air temperature rises, a humidistat mounted within said enclosure and adapted to sense the humidity of air in said enclosure, a bypass circuit around said thermistor for shunting electrical current around said thermistor to said first biasing heater, humidistat switch means in said bypass circuit actuated by said humidistat in response to high relative humidity conditions within said enclosure for conditioning said bypass circuit to conduit current around said thermistor to said first biasing heater in said thermostat, and a second biasing heater in said bypass circuit arranged in close proximity to said humidistat for adding small quantities of heat to said air surrounding said humidistat to bias said humidistat in a direction to open said humidistat switch means in said bypass circuit.

5. A control arrangement for an air conditioning apparatus of the type having a heat exchange unit adapted to cool and dehumidify air from an enclosure comprising a thermostat mounted for exposure to air of said enclosure, a temperature responsive member in said thermostat movable in one direction as the temperature of the air adjacent said member increases and movable in a reverse directions as the temperature of the air adjacent said member decreases, switch means operated by said temperature responsive member to energize said air conditioning apparatus as said air temperature adjacent said member rises above a predetermined high temperature and for de-energizing said air conditioning apparatus as the temperature adjacent said member falls below a predetermined low temperature, a biasing heater in said thermostat for adding small quantities of heat to said air surrounding said temperature responsive member thereby biasing said member in a direction tending to close said switch means to energize said air conditioning apparatus, thermistor electrically connected in series with said biasing heater, said thermistor having a coefficient of resistance inversely related to the temperature of said thermistor for decreasing the current flow through said heater and the quantity of heat output thereof as the outdoor air temperature falls and adapted to increase the current flow through said heater and the heat output thereof as the outdoor air temperature rises, a bypass circuit around said resistance thermistor for shunting electrical current around said thermistor to said biasing heater, humidistat switch means in said bypass circuit for energizing and de-energizing said circuit to bypass current to said biasing heater, a humidistat mounted within said enclosure and adapted to close sad humidistat switch means in response to high relative humidity conditions within said enclosure and for openng said humidistat switch means when the relative humidity of said enclosure falls below a predetermined humidity thereby to increase the heat output of said biasing heater when high humidity conditions exist in said enclosure even though the outdoor air temperature may be relatively low and a resistance in said bypass circuit adapted to limit the current flow through said bypass circuit.

References Cited in the file of this patent
UNITED STATES PATENTS

| | | |
|---|---|---|
| 2,283,085 | Newton | May 12, 1942 |
| 2,302,320 | Hintze | Nov. 17, 1942 |